United States Patent
Osminer et al.

(10) Patent No.: US 9,100,709 B1
(45) Date of Patent: Aug. 4, 2015

(54) CONTENT SELECTION AND PLAYBACK IN A NETWORK ENVIRONMENT

(71) Applicants: Matthew Osminer, Erie, CO (US); James C. Stark, Broomfield, CO (US)

(72) Inventors: Matthew Osminer, Erie, CO (US); James C. Stark, Broomfield, CO (US)

(73) Assignee: Time Warner Cable Enterprises LLC, New York, NY (US)

( * ) Notice: Subject to any disclaimer, the term of this patent is extended or adjusted under 35 U.S.C. 154(b) by 93 days.

(21) Appl. No.: 13/735,191

(22) Filed: Jan. 7, 2013

(51) Int. Cl.
*H04N 21/462* (2011.01)
*H04N 21/2665* (2011.01)
*H04N 21/482* (2011.01)
*H04N 21/431* (2011.01)
*H04N 21/4402* (2011.01)

(52) U.S. Cl.
CPC ......... *H04N 21/482* (2013.01); *H04N 21/4622* (2013.01); *H04N 21/2665* (2013.01); *H04N 21/431* (2013.01); *H04N 21/44029* (2013.01); *H04N 21/4821* (2013.01)

(58) Field of Classification Search
CPC .......... H04N 21/2665; H04N 21/4622; H04N 21/4821; H04N 21/431; H04N 21/44029; H04N 5/445
See application file for complete search history.

(56) References Cited

U.S. PATENT DOCUMENTS

| | | | |
|---|---|---|---|
| 7,948,949 B2 * | 5/2011 | Bowen | 370/331 |
| 8,640,174 B2 * | 1/2014 | Salkintzis et al. | 725/62 |
| 8,875,200 B2 * | 10/2014 | Park | 725/90 |
| 2002/0044144 A1 * | 4/2002 | Inoue | 345/204 |
| 2005/0177849 A1 * | 8/2005 | Pietraszak et al. | 725/44 |
| 2006/0259926 A1 * | 11/2006 | Scheelke et al. | 725/48 |
| 2006/0286984 A1 * | 12/2006 | Bonner | 455/445 |
| 2007/0101370 A1 * | 5/2007 | Calderwood | 725/47 |
| 2008/0022298 A1 * | 1/2008 | Cavicchia | 725/25 |
| 2009/0015725 A1 * | 1/2009 | Park | 348/731 |
| 2009/0052524 A1 * | 2/2009 | Peltonen | 375/240.02 |
| 2009/0109921 A1 * | 4/2009 | Bowen | 370/331 |
| 2010/0154008 A1 * | 6/2010 | Hicks et al. | 725/62 |
| 2010/0184440 A1 * | 7/2010 | Mao et al. | 455/437 |
| 2011/0122834 A1 * | 5/2011 | Walker et al. | 370/329 |
| 2011/0126234 A1 * | 5/2011 | Makhlouf | 725/43 |
| 2011/0137727 A1 * | 6/2011 | Chung et al. | 705/14.55 |
| 2011/0296463 A1 * | 12/2011 | Suslov | 725/44 |
| 2012/0284736 A1 * | 11/2012 | Friedman | 725/14 |
| 2014/0123160 A1 * | 5/2014 | van Coppenolle et al. | 725/5 |
| 2014/0208360 A1 * | 7/2014 | Kardatzke | 725/48 |

\* cited by examiner

*Primary Examiner* — Pinkal R Chokshi
(74) *Attorney, Agent, or Firm* — Chapin IP Law, LLC

(57) ABSTRACT

In response to receiving a watch now command to playback selected content, a content source selector resource identifies one or more sources (e.g., digital video recorder, video on demand, linear television channel, etc.) from which selected content is available. To select amongst multiple possible resources from which to retrieve the selected content, the content source selector resource traverses a decision tree on behalf of the user to select a source from which to retrieve selected content. In certain instances, such as when content is currently not available or the subscriber wishes to watch the content later, a subscriber can select a watch later command to indicate a desire to record content for later viewing. In this latter instance, the decision tree also can be used to select a source from which to retrieve and store selected content for later viewing.

22 Claims, 12 Drawing Sheets

CONTENT SELECTION AND PLAYBACK IN A NETWORK ENVIRONMENT

BACKGROUND

Conventional cable networks often support retrieval and playback of content from multiple different sources. In certain instances, there may be so many different ways and sources from which to retrieve particular content, it can be confusing to a subscriber.

For example, a subscriber operating a set-top box in a cable network environment may be able to tune the set-top box to a respective QAM (Quadrature Amplitude Modulated) channel to play back a scheduled television program available to multiple subscribers in a service group. Via a decoder, the set-top box decodes the scheduled television program and displays it on a display screen.

As another example, the subscriber can operate the set-top box to retrieve and playback the same content via video on demand. In such an instance, a portion of shared cable bandwidth is allocated to transmit the requested video on demand content to the respective subscriber. The set-top box tunes to the allocated channel, decodes the video on demand content, and initiates play back of the video on demand content on a respective display screen.

Conventional playback of content is not limited to receiving content over so-called QAM channels. For example, a subscriber can subscribe to IP (Internet Protocol) services enabling the subscriber to retrieve content as data packets transmitted over the web or Internet. Via communications over a respective IP data channel, the subscriber may be able to retrieve and playback the same content from a $3^{rd}$ party content service provider such as Netflix™, Hulu™, Amazon™, etc.

One way to notify a respective subscriber of available content is through a content guide. For example, a cable network provider can produce a first channel guide indicating when different content is available for viewing on respective cable network channels; the cable network provider can produce a second channel guide indicating content that is available for viewing video on demand content; the cable network provider can produce a third channel guide indicating content that is available for viewing on a storage device such as a DVR in the set-top box; and so on. The user must typically access each of the different guides to learn of available content.

In certain instances, a subscriber may also subscribe to receiving over-the-top content from a $3^{rd}$ party content service provider such as Netflix™. In this instance, the $3^{rd}$ party content service provider can produce yet another content guide indicating over-the-top content available for viewing by a user.

BRIEF DESCRIPTION OF EMBODIMENTS

Conventional techniques of retrieving content suffer from a number of deficiencies. For example, a user typically must browse multiple content guides to merely learn of content available for retrieval from different sources. The task of retrieving the different content guides and learning of the different available content itself can be difficult because of the wide variety of content that is available for viewing. Additionally, content selection can vary depending on the guide further complicating a process of selecting and viewing content.

In certain instances, the same content may be available from multiple different sources. Even if a subscriber is able to overcome the hurdle of being able to identify that the same content is available from multiple different sources, in many instances, it is difficult for the subscriber to process relevant information to make an intelligent decision as to which of the sources to retrieve and playback the content.

For example, retrieval of the content of interest may require that the subscriber pay additional fees if retrieved from one source versus another. The user may have to switch between guides to determine from which source provides access to content at a lowest cost. In another situation, the desired content may be available from different sources in one or more formats (e.g., standard definition, high definition, Spanish language English language, director's version, etc.). In such an instance, the user must select amongst multiple versions of available content. Thus, selection of content can require a substantial amount of work to find and make a selection.

Embodiments herein deviate with respect to conventional techniques. For example, one embodiment herein is directed to making it easier for a respective subscriber to select and view content in multi-source environment. Because selection and playback is easier, customers are able to watch more content as opposed to spending inordinate amounts of time searching and making a decision as to which of multiple sources to retrieve and playback respective content.

More specifically, in accordance with one embodiment, a consolidated content guide indicates different content available to a subscriber from multiple disparately located sources in a network environment. The subscriber may have access to content stored agent application the disparately located sources.

Assume that a content source selector resource receives, from a subscriber in a cable network environment, selection of content (from the consolidated content guide) to play back and/or store on a respective playback device. In such an embodiment, subsequent to receiving the selection of the content from a subscriber, the content source selector resource accesses a set of retrieval rules. The set of retrieval rules specifies a priority order of distributing (or retrieving) the selected content from multiple possible sources in the cable network environment to the subscriber. In accordance with the set of retrieval rules, the content source selector resource selects a source from which to transmit selected content to the subscriber. The content source selector resource initiates retrieval and/or transmission of the selected content to a respective playback device from a particular source in the cable network environment.

By way of a non-limiting example, the priority order as specified by the set of retrieval rules can be chosen in a manner that supports efficient use of cable network resources. For example, the selected content may be recorded on a digital video recorder in a subscriber domain. The selected content also may be available as video on demand content. The priority order used to select a particular source from which to retrieve content can indicate to retrieve the selected content from the digital video recorder in the subscriber domain in lieu of retrieving the selected content over a respective video on demand channel to avoid unnecessary use of shared cable network bandwidth. In other words, the selected content may be available from a local storage resource (i.e., a digital video recorder in the subscriber domain) with respect to the requesting subscriber. Retrieval of the selected content from the digital video recorder is desirable because alternatively retrieving the selected content as video on demand content over a shared cable network link would require use of a portion of the shared cable network bandwidth. Accordingly, embodiments herein can include preserving bandwidth on a shared communication link in a cable network environment.

Thus, on behalf of the user, the priority order as discussed herein can be used as a basis to select a source from which to more efficiently retrieve selected content. As previously discussed, the subscriber may not be able to easily make the best decision as to selecting a respective resource from which to retrieve the content.

In accordance with another embodiment, a processing resource initiates display of a title of corresponding content. Assume in this example that the content is available from multiple different sources. A content source selector resource receives selection of the title and identifies that retrieval of the corresponding content from a first source in the cable network environment is ranked higher in a priority order than retrieval of the corresponding content from a second source in the cable network environment.

In accordance with the priority order, the content source selector resource initiates transmission of the corresponding content from the first source to a respective playback device in the cable network environment. Thus, a subscriber can merely select a title of desired content displayed on a display screen. The display screen need not indicate that the content is available from multiple different sources. However, a content source selector resource detects that the selected content is available from multiple resources and utilizes the priority order as a basis to decide from which of multiple sources to initiate retrieval of the selected content. Thus, instead of the subscriber manually selecting a source from which to retrieve the selected content, the content source selector resource selects a resource and initiates playback of content on behalf of the subscriber.

In yet another embodiment, the content source selector resource as discussed herein receives, from a subscriber in a cable network environment, selection of content to record for subsequent play back on a respective playback device. Assume that the content source selector resource detects that the selected content is currently not available to a subscriber for playback from any sources or that the subscriber merely wishes to watch selected content at a later date. The content source selector resource accesses a set of storage rules specifying a priority order of storing the selected content for later playback by the subscriber. As specified by the set of storage rules, the content source selector resource initiates (on behalf of the subscriber) storage of the selected content from a particular source (selected amongst multiple possible sources) in the cable network environment. Thus, a subscriber can merely select a title of desired content to store for later playback. The content source selector resource (such as a behind-the-scene processing resource such as utilizes the priority order information as a basis to decide, on behalf of the subscriber making the selection, from which of multiple sources to initiate storage of the selected content.

Thus, via displaying titles of available content and not necessarily the sources from which the content can be retrieved, embodiments herein can include abstracting away the concept of where content is coming from and just making it clear the subscriber can watch selected content immediately by merely displaying available content options. In one embodiment, a subscriber can select content such as by applying a "watch now" command to a title of content. As discussed herein, a behind-the-scene processor such as content source selector resource selects a source form which to retrieve the content on behalf of the subscriber, alleviating the subscriber from having to make the decision.

Further embodiments herein can include identifying the available sources (e.g., digital video recorder, video on demand, linear television channel, etc.) from which selected content is available and traverse a decision tree on behalf of the user to select a source from which to retrieve the selected content.

In certain instances, such as when content is currently not available to a user or the subscriber would like to record content for later viewing, selection of a "watch later" command enables the subscriber to indicate a desire to record content. Again, priority order information for recording content from different possible sources can be used to determine from which of multiple sources to record content in the future.

These and other more specific embodiments are disclosed in more detail below.

Any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware or shortcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, apparatus, computer program product, etc., that supports operations as discussed herein.

One embodiment herein includes a computer readable storage medium and/or system having instructions stored thereon. The instructions, when executed by a processor of a respective computer device, cause the processor or multiple processors of the system to: receive, from a subscriber in a cable network environment, selection of content to play back on a respective playback device; access a set of retrieval rules specifying a priority order of distributing the selected content from multiple possible sources in the cable network environment; and initiate transmission of the selected content to the respective playback device from a particular source in the cable network environment as specified by the set of retrieval rules.

Another embodiment as discussed herein includes a computer readable storage medium and/or system having instructions stored thereon. The instructions, when executed by a processor of a respective computer device, cause the processor or multiple processors of the system to: initiate display of a title of corresponding content available from multiple sources in a cable network environment; receive selection of the title; identify that retrieval of the corresponding content from a first source in the cable network environment is ranked higher in a priority order than retrieval of the corresponding content from a second source in the cable network environment; and initiate transmission of the corresponding content from the first source to a respective playback device in the cable network environment.

Yet another embodiment includes a computer readable storage medium and/or system having instructions stored thereon. The instructions, when executed by a processor of a respective computer device, cause the processor or multiple processors of the system to: receive, from a subscriber in a cable network environment, selection of content to record for subsequent play back on a respective playback device; detect that the selected content is currently not available to a subscriber for playback; access a set of storage rules specifying a priority order of storing the selected content for later playback by the subscriber; and initiate storage of the selected content from a particular source in the cable network environment as specified by the set of storage rules.

The ordering of the steps in the above embodiments has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, hardware alone such as within a processor, within an operating system, within a software application, etc.

Note further that techniques herein are well suited for selecting a source amongst multiple sources from which to distribute content. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in any combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Figure 1:
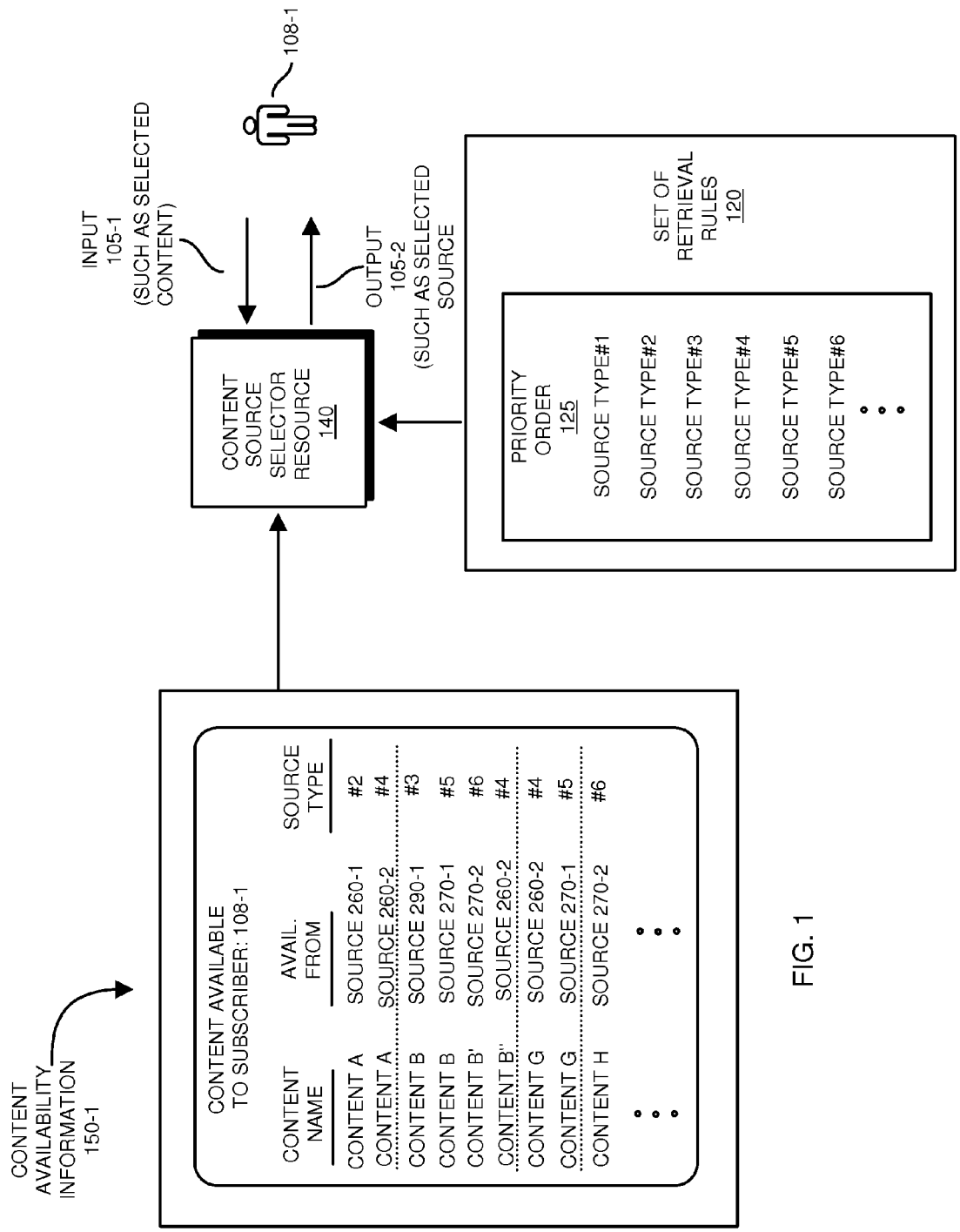
FIG. 1 is an example diagram illustrating a content source selector resource according to embodiments herein.

Now, more specifically, FIG. 1 is an example diagram illustrating a content source selector resource according to embodiments herein.

As shown, content source selector resource 140 receives input 105-1 such as selection of content from a respective user 108-1. The content source selector resource 140 has access to content availability information 150-1 indicating different content available to user 108-1. In one embodiment, the content availability information 150-1 is a consolidated content guide indicating titles of content available for retrieval by subscriber 108-1. Note that, in certain instances, the same title of content can be available form disparately located resources in a network environment.

In this example embodiment, as indicated by the content availability information 150-1, a copy of the content A is available from multiple sources including source 260-1 and source 260-2; content B (or other versions of the same content such as content B', content B", etc.) is available from source 290-1, source 270-1, source 270-2, and source 260-2; content G is available from source 260-2 and source 270-1; content H is available from source 270-2, and so on.

In one embodiment, content B represents a version of movie without commercial advertisements, content B' is a director's cut of the movie, content B" is a version of the movie in Spanish. Thus, the same content may be available in different formats or versions from the same or different source.

The input 105-1 from subscriber 108-1 indicates content requested to be played back and/or stored on a respective playback or storage device operated by the user 108-1.

To select a respective source from which to retrieve content, on behalf of the user 108-1, the content source selector resource 140 accesses a set of retrieval rules 120 specifying a priority order 125 of distributing the selected content from multiple possible sources. In this example embodiment, the priority order 125 indicates that a source of type #1 is a highest ranked source; a source of type #2 is a next highest ranked source; a source of type #3 is a next highest ranked source; a source of type #4 is a highest ranked source; and so on. The priority order 125 of the different types of resources indicates the different possible types and ranking by type of different sources from which content can be retrieved in a network environment.

In accordance with the set of retrieval rules 120 and which source is ranked highest in the priority order 125, the content source selector resource 140 initiates transmission of the selected content to the respective playback device operated by the user 108-1. For example, assume in this example that the user 108-1 selects content B for retrieval and/or playback. In such an instance, the content source selector resource 140 accesses the content availability information 150-1 to learn that versions of selected content B are available from source 290-1 (type #3), source 270-1 (type #5), source 270-2 (type #6), and source 260-2 (type #4).

In one embodiment, each of the possible sources (e.g., source 290-1, source 270-1, source 270-2, and source 260-2) is classified as a different type as indicated by content availability information 150-1. For example, source 290-1 is classified as a source type #1; source 270-1 is classified as a source type #5; source 270-2 is classified as a source type #6; source 270-1 is classified as a source type #4.

By way of a non-limiting example embodiment, source type #1 represents a storage resource (e.g., digital video recorder, computer device, etc.) located in a respective subscriber domain that stores respective content; source type #2 represents a scheduled cable network television channel such as a broadcast channel; source type #3 represents a storage resource (e.g., network digital video recorder, . . . ) located external to the subscriber domain but accessible by the subscriber; source type #4 represents a channel such as a video on demand channel from which a subscriber can retrieve content; source type #5 represents a IPTV channel from which a subscriber can retrieve respective content as data packets; source type #6 represents a server operated by a $3^{rd}$ party content service provider (e.g., Hulu™, Netflix™, Amazon™, etc.) that makes content available to the subscriber over an IP connection; and so on.

In accordance with the priority order 125, and classification of the sources by type, the content source selector resource 140 determines that the order of preference for retrieving content B from highest to lowest is source 290-1 (type #3), source 260-2 (type #4), source 270-1 (type #5), and source 270-2 (type #6). In this example, because the priority order 125 indicates that source 290-1 is the highest in ranking, the content source selector resource 140 produces output 105-2 to indicate that source 290-1 has been selected as a source from which to distribute the selected content (as specified by input 105-1) to a playback device operated by the user 108-1.

In one embodiment, the priority order 125 serves as a decision tree. For example, if the selected content is available from the type #1 resource (such as a local storage device), the content source selector resource 140 selects the first type of resource to transmit the selected content to a playback device operated by the user.

If the selected content is not available from the type #1 resource (i.e., source type #1) in the priority order 125, the content source selector resource 140 checks whether the selected content is available from a second type (i.e., source type #2) of resource (such as a linear television channel). If so, the content source selector resource selects the second type of resource to transmit the selected content to the playback device operated by the user.

If the selected content is not available from the second type (i.e., source type #2) of resource, in accordance with the priority order 125, the content source selector resource 140 checks whether the selected content is available from a third type (i.e., source type #3) of resource (such as a cloud-based digital video recorder). If so, the content source selector resource 140 selects the third type of resource to transmit the selected content to the playback device operated by the user.

If the selected content is not available from the third type (i.e., source type #3) of resource, in accordance with the priority order 125, the content source selector resource 140 checks whether the selected is available from a fourth type (i.e., source type #4) of resource (such as a video on demand channel). If so, the content source selector resource 140 selects the fourth type of resource to transmit the selected content to the playback device operated by the user, and so on.

In this manner, the content source selector resource 140 steps through the priority order 125 to find a highest ranked source from which to retrieve and/or transmit content to the user 108-1.

As discussed herein, the priority order 125 is used as a basis to make behind the-scene selection of sources for each of multiple subscribers in a cable network environment. The classification of resources from which content is available can be made with respect to each subscriber in the cable network environment. However, the content available to a respective subscriber and corresponding sources from which content is available may vary because not all subscribers subscriber to the same service plans.

In one embodiment, for each respective subscriber, a corresponding source from which content is available to the respective subscriber is classified by source type. The priority order 125 is then used as a basis to rank the different classified sources.

Figure 2:
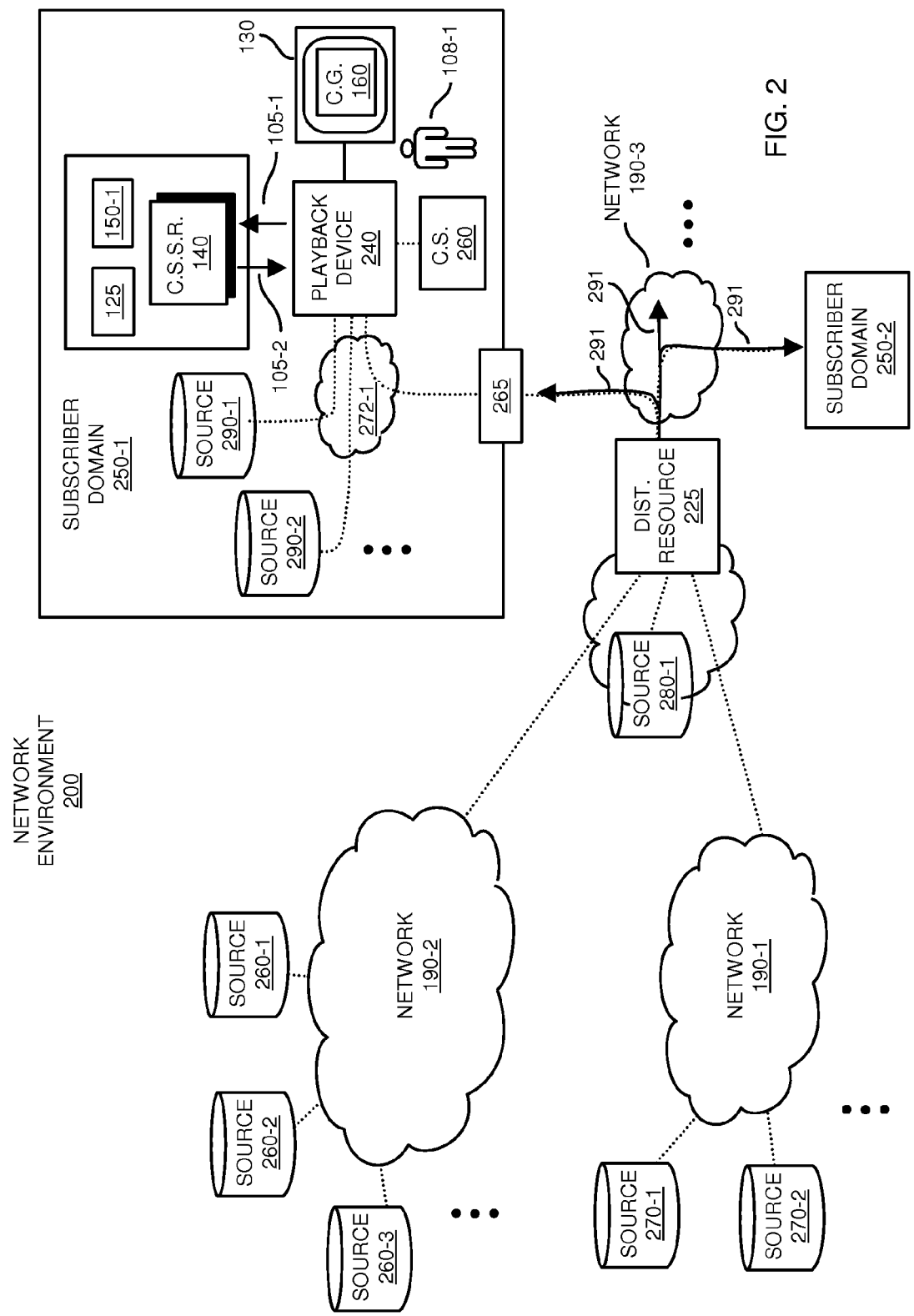
FIG. 2 is an example diagram illustrating a network environment implementing a content source selector resource according to embodiments herein.

FIG. 2 is an example diagram illustrating a network environment in which to implement source selection and playback of content according to embodiments herein.

As shown in network environment 200 such as a cable network environment, the user 108-1 can be a subscriber that resides in subscriber domain 250-1. The subscriber 108-1 can operate one or more devices (inside or outside of) the subscriber domain to retrieve, store, and/or playback content.

In one embodiment, communication interface 265 enables the subscriber 108-1 to selectively receive content from remote sources (e.g., source 260-1, source 260-2, source 260-3, . . . , source 270-1, source 270-2, . . . , source 280-1, . . . ) through distribution resource 225 and over shared communication link 291.

Note that subscriber domain 250-1 may also include a network 272-1 including routers, base stations, interfaces, WiFi™ connections, etc., enabling the playback devices to communicate locally and retrieve content from sources (e.g., source 290-1, source 290-2, etc.) in subscriber domain 250-1. Also, via the network 272-1, the devices in subscriber domain 250-1 are also able to communicate with communication interface 265 and receive content from over shared communication link 291.

Subscriber domain 250-1 can be one of multiple subscriber domains in network environment 200 that shares use of communication link 291 to receive and transmit content. For example, distribution resource 225 (e.g., a gateway resource, cable modem termination system, edge server, headend, etc.) can receive content from any of multiple sources (e.g., source 260-1, source 260-2, source 260-3, . . . ) over network 190-2. Distribution resource 225 also can receive content from any of multiple sources (e.g., source 270-1, source 270-2, . . . ) over network 190-1 such as a network supporting IP data packets and respective data traffic.

Via communications to and from distribution resource 225 over shared communication link 291, the subscribers in respective subscriber domains in a service group are able to retrieve content from distribution resource 225.

As previously discussed, in certain instances, in addition to receiving content over a network such as network 190-3 from a remote location, content can be available to a respective subscriber via one or more sources disposed in a respective subscriber domain. For example, content can be stored in sources 290-1, 290-2, etc. disposed in subscriber domain 250-1. The user 108-1 (such as a cable network subscriber) can have access to content stored locally in sources 290-1, 290-2, etc., in a manner as previously discussed.

Further content can be available from a source 280-1 such as a cloud-based digital video recorder.

By way of a non-limiting example, note that source 290-1 can represent a digital video recorder device disposed in subscriber domain 250-1; source 290-2 can represent a computer device disposed in subscriber domain 250-1; source 260-1 can represent a linear or scheduled television program from which subscriber domain 250-1 can receive content over shared communication link 291; source 260-2 can represent a free video on demand channel from which subscriber domain 250-1 can receive content over shared communication link 291; source 260-3 can represent a pay per view channel from which subscriber domain 250-1 can receive content over shared communication link 291 for a fee; source 270-1 can represent an IPTV (Internet Protocol TeleVision) channel from which subscriber domain 250-1 can receive content over shared communication link 291; source 270-2 can represent a $3^{rd}$ party content service provider (IP) channel such as Netflix™, Hulu™, Amazon™, etc., from which subscriber domain 250-1 can receive content over shared communication link 291; source 280-1 can represent an in-the-cloud digital video recorder source from which subscriber domain 250-1 can receive content over shared communication link 291; and so on.

As previously discussed, depending on input from a respective subscriber, distribution resource 225 can communicate content from any of one or more remote sources (e.g., 260-1, 260-2, 260-3, 270-1, 270-2, 280-1, etc.) over communication link 291 to one or more subscriber domains 250 in shared network 190-3.

In one embodiment, the communication link 291 is a shared physical resource such as a cable, fiber optic link, etc. The bandwidth in shared communication link 291 can be split into at least a first portion and a second portion.

By further way of a non-limiting example, the first portion of bandwidth capacity in the shared communication link 291 can support IP type data packet traffic in which data is delivered as one or more data packets via network addresses assigned to respective playback devices. For example, each of multiple devices operated by a respective subscriber in the cable network environment that use the shared communication link 291 can be assigned an appropriate network address to send and receive data over IP connections. Via client server type communications, the subscriber-operated devices (such as playback device 240 or any other device) in subscriber domain 250-1 are able to retrieve content from remote sources such as source 270-1, source 270-2, etc. In one embodiment, each of the sources is or includes a server to receive requests for content. As their name suggests, the servers initiate distribution of requested content to subscribers.

Note that the second portion of bandwidth capacity of the shared communication link 291 can support QAM (Quadrature Amplitude Modulated) data transmissions in which content is modulated onto and transmitted over one or more carrier frequency in the shared communication link 291 to respective subscribers. To receive content, a respective subscriber tunes to a respective QAM channel to retrieve content over the shared communication link. A cable network content service provider transmits content over the one or more QAM channels.

As mentioned, each subscriber in network environment 200 is not necessarily limited to receiving content from a single service provider. For example, a first content service provider such as a cable network content service provider can make content available from one or more sources (e.g., sources 260, source 270-1, source 280-1, etc.) in network environment 200; a second content service provider (such as an over-the-top content service provider) can make content available from one or more sources (such as source 270-2) in network environment 200; and so on.

In certain instances, it may be possible for a respective subscriber to retrieve content from a first content service provider (such as a cable network service provider) via either tuning to appropriate QAM channels transmitted over shared communication link 291 and/or receiving the content as IP data packets over the shared communication link 291. Further, it may be possible for a subscriber to retrieve content from a second content service provider (e.g., an over-the-top content service provider) via IP data packets over shared communication link 291.

In one embodiment, a first content service provider (such as a cable network content service provider) makes content available from sources 260, source 270-1, and sources 280. A second content service provider such as Netflix™ can provide access to content via one or more sources such as source 270-2.

Note that shared communication link 291 can be any suitable type of physical or non-physical resource (e.g., communication link, bandwidth, logical channel, coaxial cable, fiber optic link, etc.) that provides connectivity between distribution resource 225 and each of multiple subscriber domains 250 (e.g., subscriber domain 250-1, subscriber domain 250-2, etc.).

As mentioned, shared communication link 291 enables each of multiple subscribers (and devices) in respective subscriber domains 250 in a respective service group to share bandwidth on a communication link and retrieve content from different sources. For example, the subscribers can tune a respective communication device to play back content received over one or more QAM channels. The one or more QAM channels can support scheduled or so-called linear cable television programs, video on demand programs, etc., available to each of the subscribers 210 that shares use of communication link 291 and that subscribe to services provided by a remote server cable network content service provider.

As previously discussed, the subscribers that subscriber to an IP service plan provided by a cable network service provider can initiate retrieval of content over IP data channels as well. In such an instance, a device operated by the subscriber is a client device. As mentioned, the client device can communicate with one or more servers in network 190-1 to retrieve appropriate content from disparately located sources such as source 270-1, source 270-2, etc.

As previously discussed, each subscriber domain can include one or more sources that store content. As an example, subscriber domain 250-1 includes source 290-1, source 290-2, etc. The user 108-1 in subscriber domain 250-1 can initiate local retrieval of content for playback on respective playback device 240. Network 190-4 such as a home network provides connectivity amongst the different resources.

To determine available content, the subscriber 210-1 can initiate retrieval of content guide 160 for viewing on a respective display screen 130. The content guide 160 can be retrieved from any suitable resource such as a cable network content service provider.

In one embodiment, an aggregator resource generates the content availability information 150-1 indicating which of multiple different sources content can be retrieved by the subscriber 108-1. Details of an example aggregator resource to produce content availability information 150-1 are described in U.S. patent application Ser. No. 13/719,719 entitled "CONTENT DISCOVERY AND PLAYBACK IN A NETWORK ENVIRONMENT,", filed on Declaration 19, 2012, the entire teachings of which are incorporated herein by this reference. Thus, one embodiment herein includes producing content availability information 150-1 for a respective subscriber to indicate which of multiple different titles of content are available to the subscriber from each of the multiple possible disparate sources.

As mentioned, via the content guide 160, the subscriber 210-1 is able to view content available from one or more content service providers. In certain instances, as previously discussed in FIG. 1, the same content is available to the user 108-1 from multiple different remote or local sources. For example, according to content availability information 150-1 in FIG. 1, content A is available to subscriber 108-1 from remote source 260-1 and remote source 260-2; content B is available to subscriber 108-1 from local source 290-1, as well as remote sources 270-1, 270-2, and 260-2; content G is available to subscriber 108-1 from remote source 260-1 as well as remote source 270-1; and so on.

As discussed herein, the priority order 125 can indicate a priority of receiving content from different sources in a network environment. Note that a processing resource can be configured to generate the priority order 125 based on a location of the respective resource in the network environment 200. For example, in one embodiment, the processing resource produces the priority order 125 to select transmission of the selected content from a storage resource within a subscriber domain in which a subscriber resides to be higher in ranking than a respective source offering availability of the same content available over shared communication link 291.

Figure 3:
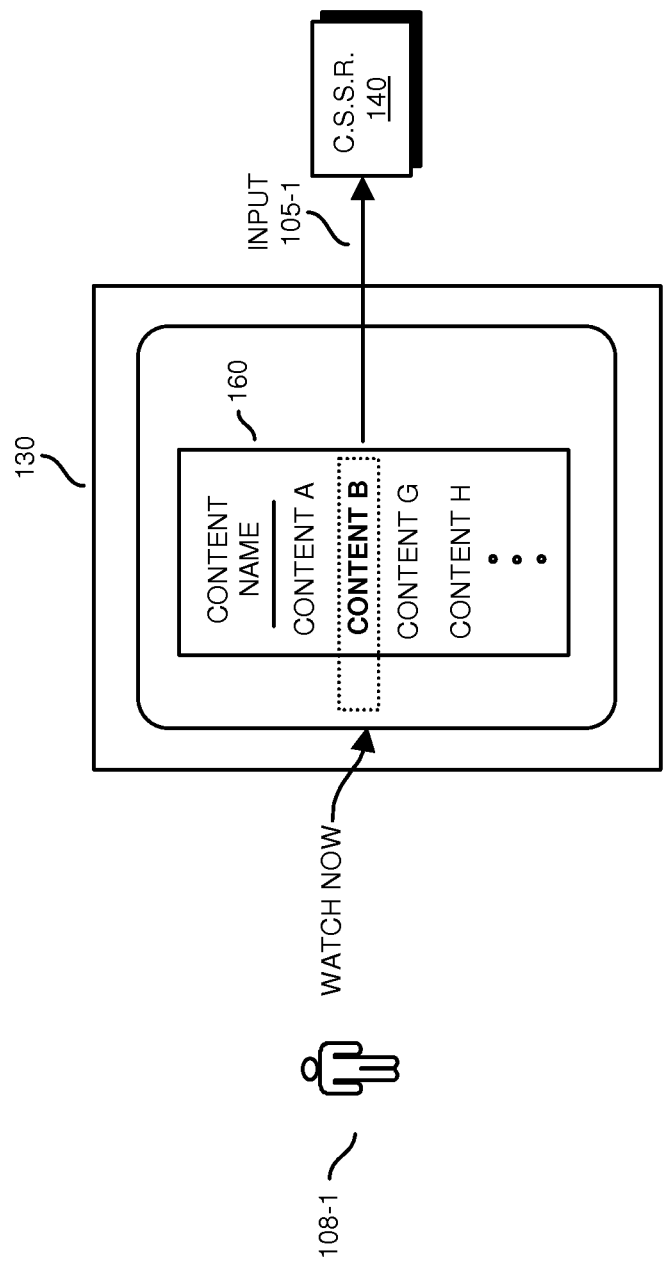
FIG. 3 is an example diagram illustrating a content guide indicating availability of content and execution of a watch now command according to embodiments herein.

FIG. 3 is an example diagram illustrating a rendition of a content guide indicating availability of content and execution of a watch now command according to embodiments herein.

One embodiment herein includes producing the content guide 160 to display of a single entry (e.g., symbol, hyperlink, reference, etc.) for available content even though the content is available from multiple different resources. In other words, to simplify the selection process, embodiments herein can include presenting a subscriber with a single selectable option to play back a particular title of content even though the content is available from multiple different sources.

More specifically, as previously discussed, content A is available from multiple sources; the content guide 160 displays a single selectable option CONTENT A to user 108-1. The content B is available from multiple sources; the content guide 160 displays a single option CONTENT B to user 108-1. The content G is available from multiple sources; the content guide 160 displays a single option CONTENT G to user 108-1, and so on.

To select content for immediate viewing, the user 108-1 applies a watch now command to selected content. In this example embodiment, assume that the subscriber 108-1 selects content B as shown. In response to a subscriber's application of the WATCH NOW command to entry CONTENT B displayed in a rendition of the content guide 160, the playback device 240 produces input 105-1 to indicate selection of content B by the user 108-1. In a manner as previously discussed, in response to receiving input 105-1, the content source selector resource 140 selects amongst multiple sources to retrieve the selected content for delivery to playback device 240.

More specifically, subsequent to receiving selection of the single selectable option CONTENT B displayed in a rendition of content guide 160, the content source selector resource 140 utilizes the content availability information 150-1 to identify that the selected content is retrievable from multiple different possible sources (e.g., source 290-1, source 270-1, source 270-2, source 260-2). The content source selector resource 140 utilizes the priority order 125 to determine a ranking of the multiple different possible sources. For example, source 290-1 is of type #1 and is thus ranked first; source 270-1 is of type #5 and is thus ranked fifth; source 270-2 is of type #6 and is thus ranked sixth; source 260-2 is of type #4 and is thus ranked fourth.

Source 290-1 is ranked highest amongst the possible resources from which the selected content B is available. In response to detecting that source 290-1 resides higher in rank in the priority order than other sources, the content source selector resource 140 produces output 105-2 selecting the source 290-1 as a resource from which to transmit the selected content to the respective playback device 240. In other words, via the priority order 125, the content source selector resource 140 can be configured to detect that the storage source 290-1 disposed in the subscriber domain 250-1 is preferable over retrieving the selected content B from other lower ranked remote sources such as source 270-1, source 270-2, and source 260-2.

Accordingly, embodiments herein can include subsequent to receiving selection of a single selectable option in a rendition of the content guide 160, identifying a grouping of multiple resources in the cable network environment from which the selected content is available; and as specified by a priority order 125 in the set of retrieval rules 120, selecting a particular source (e.g., source 290-1) amongst the multiple resources (e.g., source 290-1, source 270-1, source 270-2, source 260-2) in the grouping to initiate the play back of the selected content B on the respective playback device 240.

As previously discussed, embodiments herein can include utilizing the classification information to indicate a type of device in which content is stored or from which the content can be retrieved. For example, via classification type information: the content source selector resource 140 detects that the source 290-1 is a type #1 storage resource which is disposed in subscriber domain 250-1 of the cable network environment; the content source selector resource 140 detects that the source 260-2 is a type #4 resource is a remotely located storage resource over shared communication link 291; and so on.

In one embodiment, selection of the source 290-1 by content source selector resource 140 can include initiating transmission of the corresponding content B from the source 290-1 to a respective playback device 240 in the subscriber domain 250-1. For example, via output 105-2 indicating to retrieve selected content B from highest rank source 290-1, the content source selector resource 140 can notify the respective playback device 240 to retrieve the content B from source 290-1. In accordance with output 105-2 received from the content source selector resource 140, the playback device 240 initiates retrieval of the selected content B from the source 290-1 as specified by output 105-2.

Alternatively, on behalf of the playback device 240, the content source selector resource 140 can initiate transmission of the corresponding content B via communications with the source 290-1. In response to the communications, the source transmits content B to playback device 240.

Figure 4:
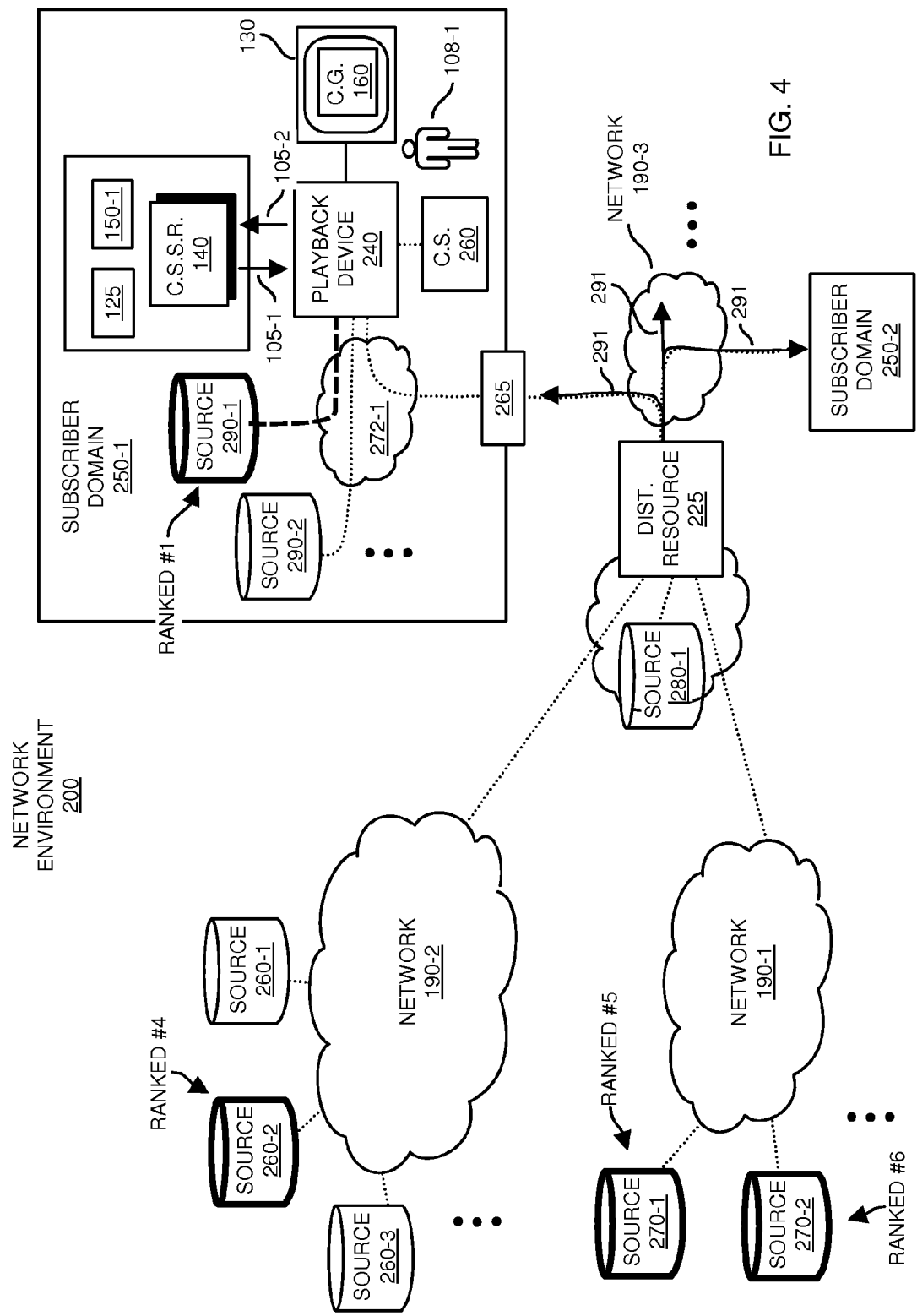
FIG. 4 is an example diagram illustrating selection of content and distribution of the selected content according to embodiments herein.

FIG. 4 is an example diagram illustrating selection of content and distribution of the selected content according to embodiments herein.

In this example embodiment, assume that the user 108-1 selects content B for playback as discussed above in FIG. 3. In a manner as previously discussed, based on input 105-1 indicating selection of content B, the content source selector resource 140 produces output 105-2 indicating selection of (highest ranked source) source 290-1 to retrieve and playback content B on playback device 240 as previously discussed.

As a modified version of the above example embodiment, assume that content availability information 150-1 indicates that content B is available only from source 260-2 and source 270-1. Content B is not available from source 290-1 and source 270-2. In such an instance, the content source selector resource 140 would determine from priority order 125 and content availability information 150-1 that source 260-2 is highest in the ranking and thus select source 260-2 for transmission of selected content to playback device 240.

In addition to and/or as an alternative method to selecting content based on priority order 125, note that further embodiments herein can include monitoring available bandwidth. For example, content source selector resource can be configured to monitor the shared communication link 291 for bandwidth available on at least one QAM (Quadrature Amplitude Modulated) channel in the network environment 200; and monitor shared communication link 291 for bandwidth available on one or more IP (Internet Protocol) data channels in the network environment 200.

In addition or in lieu of priority order ranking as discussed herein, note that the selection of the source from which to retrieve content can be based at least in part on the bandwidth available on the at least one QAM channel versus bandwidth available on the at least one IP data channel. For example, if there are no QAM channels available to retrieve content B (e.g., via video on demand), the content source selector resource 140 can be configured to select source 270-1 to retrieve content B over an IPTV channel instead of adhering to retrieval of the selected content B from 260-2 because it is ranked higher in priority.

Additionally, via processing of the content availability information 150-1, the content source selector resource 140 may identify that selected content is available to the subscriber from a first source over a communication link 291 that is shared by a service group of multiple subscribers in the cable network environment; the content source selector resource 140 can identify that the selected content is not available to the subscriber from a second source disposed in a subscriber domain in which the subscriber resides. The content source selector resource 140 can be configured to process the set of retrieval rules 120 and priority order 125 and, based on the processing, identify that retrieval of the selected content from the first source is ranked highest for retrieval of the selected content from a group of multiple candidate sources from which the content is available. The content source selector resource 140 then initiates transmission of the selected content from the first source to the respective playback device 240.

In accordance with further embodiments, note that selection of the source can be based at least in part on configuration settings of a respective user. For example, a subscriber can generate configuration settings indicating that a respective user always prefer to receive content in an English format in lieu of a Spanish format. In such an instance, a source that transmits the Spanish formatted content can be removed as a candidate source from which to transmit the selected content to the requesting user 108-1. In other words, the content source selector resource 140 can be configured to access metadata associated with the different versions of available content. The content source selector resource 140 can eliminate certain sources as candidates from which to retrieve respective content because the subscriber does not wish to retrieve content in a particular format.

In accordance with yet further embodiments, the content source selector resource 140 can be configured to rank sources depending on different fees associated with retrieval of content from different sources. For example, the content guide 160 can indicate that content G such as the movie "Gone With The Wind" is immediately available for consumption from both source 260-2 and source 270-1. Based on ranking of candidate sources 260-2 and source 270-1 in accordance with priority order 125, the content source selector resource 140 determines that source 260-2 is ranked higher than source 270-1. However, metadata processed by the content source selector resource 140 can indicate that the rental fee to the subscriber 108-1 to retrieve the selected content G from source 260-2 may be $7.99, whereas the rental fee to retrieve content G from source 270-1 may be $3.99 or even free. In such an instance, the content source selector resource 140 can be configured to override the ranked order and select source 270-1 as the best choice to retrieve the selected content G. In other words, based on fee metadata, in this instance, the content source selector resource 140 notifies the subscriber 108-1 (or playback device 240) to retrieve the requested content G from source 270-1 since the corresponding rental fees is lower from that source than source 260-2.

Figure 5:
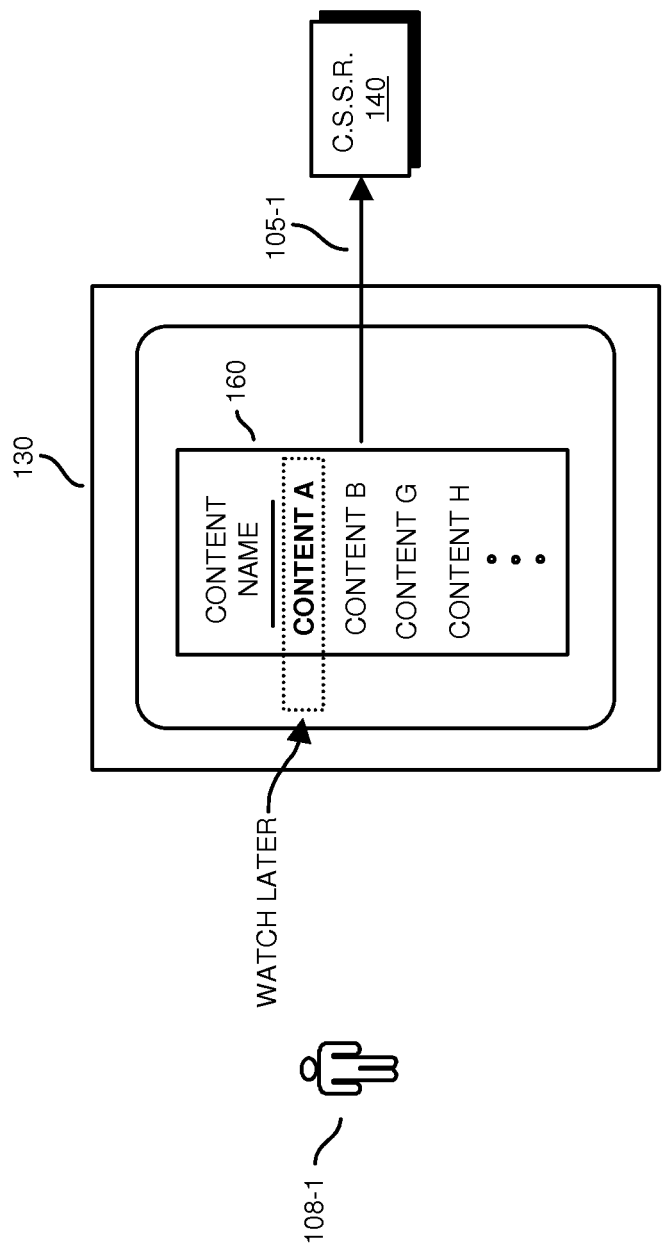
FIG. 5 is an example diagram illustrating a content guide indicating availability of content and execution of a watch later command according to embodiments herein.

FIG. 5 is an example diagram illustrating a content guide indicating availability of content and execution of a watch later command according to embodiments herein.

As shown in this example embodiment, content guide 160 displays availability of content to a respective user 108-1.

Assume in this example embodiment that the user 108-1 (such as a cable network subscriber) would like to watch content A at a later time. In such an instance, as shown, the user 108-1 applies a WATCH LATER command to the entry labeled content A. The content A may or may not be immediately available for viewing. If the content A is not currently available for viewing, only the WATCH LATER command may be applied to the entry for content A in consolidated content guide 160.

Application of the WATCH LATER command to the content A entry indicates that the subscriber 108-1 would like to record the content for later playback.

In response to receiving selection of content A to record for subsequent play back on a respective playback device, the content source selector resource 140 accesses a set of storage rules specifying a priority order for storing the selected content for later playback by the user 108-1. In accordance with the priority order 125 or other suitable priority order, the content source selector resource 140 initiates storage of the selected content A from a particular source in the cable network environment as specified by the priority order.

More specifically, assume that the content source selector resource 140 first identifies that the selected content is available from multiple sources including a first source and a second source in network environment 200. The content source selector resource 140 identifies attributes of the first source and the second source. Based on the identified attributes (e.g., classification of type as previously discussed), the content source selector resource 140 ranks the first source and the second source in a manner as specified by the set of storage rules.

In this example embodiment, assume that the content source selector resource 140 processes content availability information 150-1 and identifies that the selected content A is available from source 260-1 (e.g., a scheduled television program channel) and source 260-2 (e.g., video on demand channel). The content source selector resource 140 then determines a ranking of the sources 260-1 and 260-2 based on application of priority order 125.

In response to detecting that the source 260-1 (e.g., classified as a source type #2) is ranked higher in the priority order 125 than the source 260-2 (e.g., classified as a source type #4), the content source selector resource 140 initiates retrieval and storage of the selected content A from the source 260-1 (at an appropriate scheduled time in this example) to an appropriate storage resource (e.g., source 290-1 such as an digital video recorder) accessible to the user 108-1.

Storage of the selected content A can include receiving the selected content A over a shared communication link 291 in the network environment 200 and storing retrieved content A in a storage resource 290-1 disposed in subscriber domain 250-1 in which the user 108-1 resides.

In one embodiment, the content source selector resource 140 can access the set of storage rules and priority order 125 and storage of selected content A to a storage resource in the subscriber domain 250-1 in response to detecting that the selected content A is currently not available to the subscriber for playback. In other words, in one embodiment, the user 108-1 may apply the WATCH NOW command to selected content A for immediate playback on the playback device 240. In response to detecting that the content A is not immediately available for playback, the content source selector resource 140 can initiate retrieval of the selected content in a respective repository such as source 290-1.

Figure 6:
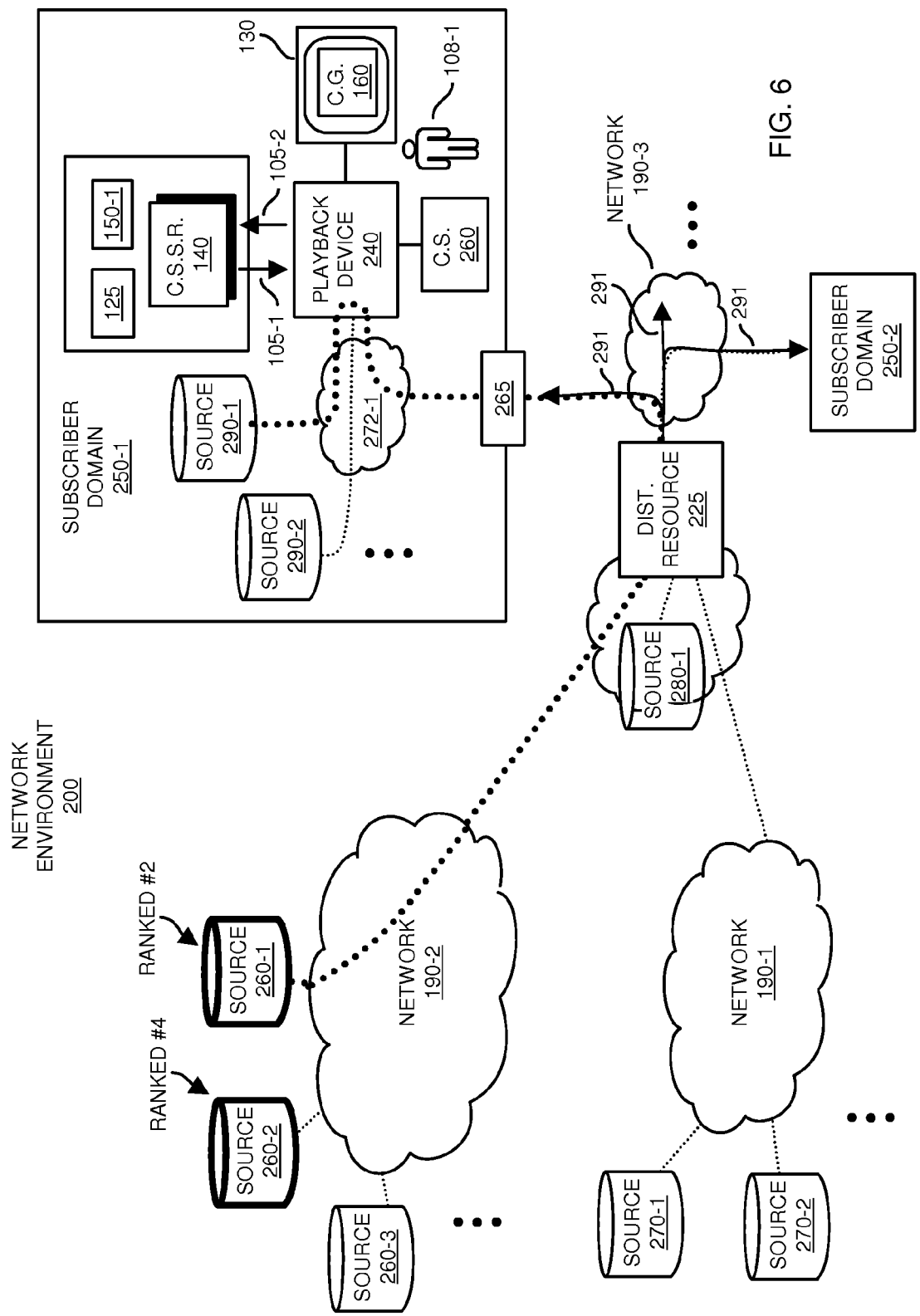
FIG. 6 is an example diagram illustrating selection of content and storage of the selected content according to embodiments herein.

FIG. 6 is an example diagram illustrating selection of content and storage of the selected content according to embodiments herein.

As previously discussed, assume that the subscriber 108-1 applies the WATCH LATER command to content A as described in FIG. 5. As shown in FIG. 6, and in accordance with content availability information 150-1, both source 260-1 and source 260-2 are candidate resources from which to retrieve and store selected content A. In this example embodiment, because source 260-1 is ranked higher in priority, the content source selector resource 140 notifies playback device to retrieve content A from source 260-1 and store such content in source 290-1 in subscriber domain 250-1. Source 260-1 (e.g., a type #2 source such as a linear channel a channel in which content A is made available in a scheduled timeslot to multiple subscribers) is ranked higher than source 260-2 because the storage of content A from source 260-1 in a scheduled time slot does not require use of any extra bandwidth on shared communication link 291. Accordingly, embodiments herein can include preserving bandwidth on shared communication link 291.

Figure 7:
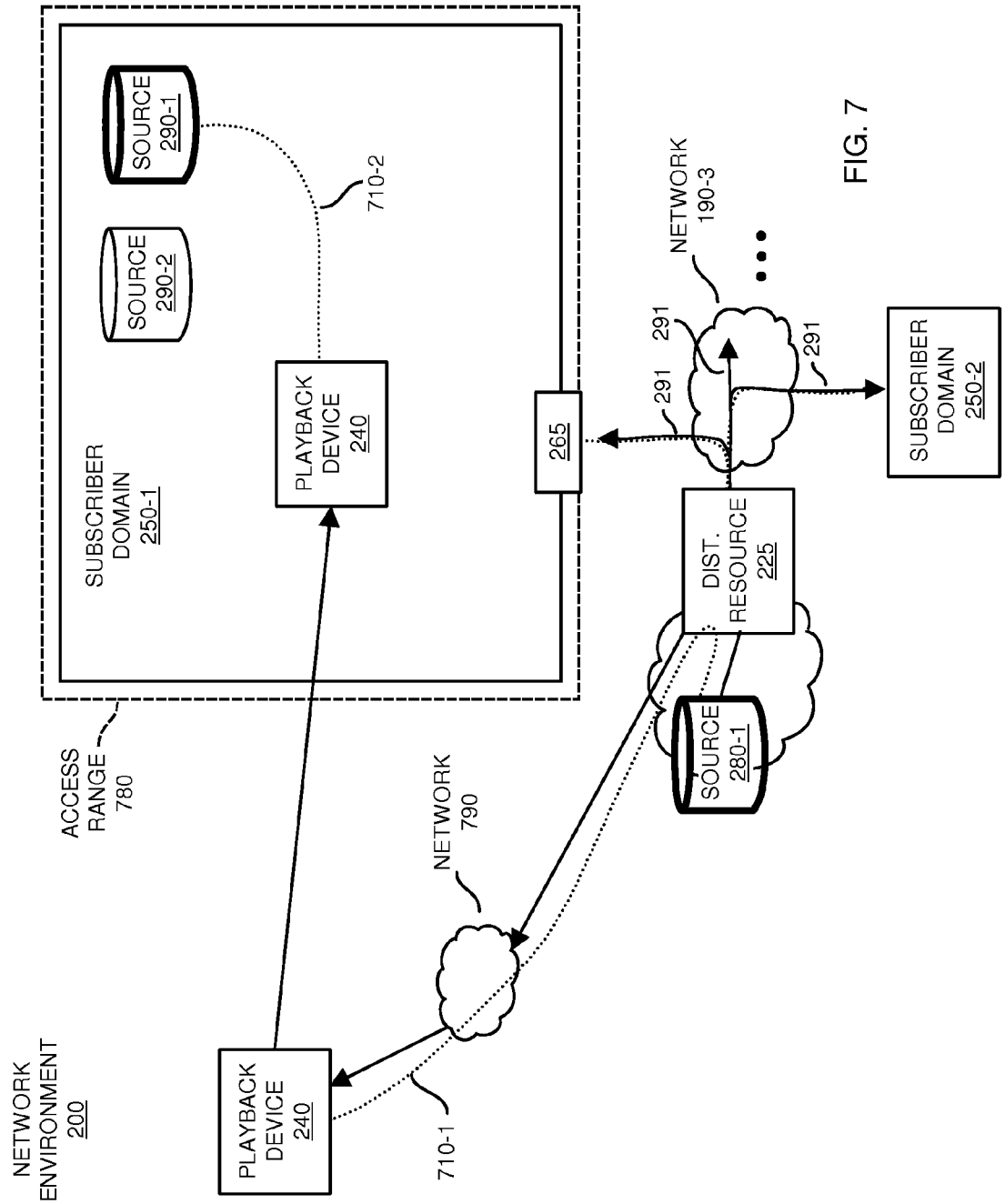
FIG. 7 is an example diagram illustrating movement of a client and switchover of distributing selected content from a first storage resource to the client to distributing selected content from a second storage resource to the client according to embodiments herein.

FIG. 7 is an example diagram illustrating switchover of distributing selected content from a first storage resource to a client to distributing selected content from a second storage resource to the client according to embodiments herein.

More specifically, the subscriber 108-1 can operate a respective playback device 240 outside of a subscriber domain 250-1. The priority order from which to retrieve selected content can vary depending on a current location of the playback device 240.

For example, a subscriber 108-1 may initially operate a respective playback device 240 outside the subscriber domain 250-1. Assume that the subscriber 108-1 accesses stored content over network 790 such as a WiFi™ network, 3G cellular network, 4G cellular network, etc. Via access over network 790, the playback device 240 is able to communicate with and retrieve selected content from source 280-1 (such as a cloud-based digital video recorder or other suitable resource).

Note that while outside of subscriber domain 250-1 and/or access range 780, the subscriber 108-1 may also have access to content stored in subscriber domain 250-1 via communications over shared communication link 291 to a respective source.

In one embodiment, when the playback device 240 is located outside the access range 780, the content source selector resource 140 selects which of multiple sources is best for retrieving content depending on whether the subscriber 108-1 resides inside or outside the subscriber domain 250-1.

As a more specific example, assume in this example that selected content is stored in or available from both source 280-1 and source 290-1. The content can be partitioned into a logical sequence of segments stored in each of source 280-1 and source 290-1.

In accordance with a first set of retrieval rules and priority order information, during a first window in which the respective playback device is outside of a wireless access range 780 with respect to the subscriber domain 250-1 (such as a subscriber's home cable network environment), the content source selector resource 140 ranks the source 280-1 and source 290-1. Because the playback device 240 is detected as being outside the subscriber domain 250-1, the content source selector resource 140 ranks source 280-1 higher in a priority order rank than source 290-1 because retrieval of content from source 290-1 would require use of bandwidth in shared communication link 291. Thus, in this example embodiment, because the playback device 240 is detected as being outside of the access range 780, the content source selector resource 140 selects source 280-1 as a source for initiating retrieval of selected content by the subscriber 108-1 to preserve bandwidth on shared communication link 291.

Thus, while outside a wireless access range 780 of subscriber domain 250-1, the playback device 240 retrieves selected content over communication link 710-1 although the content could alternatively be retrieved over a path including network 790, distribution resource 225, and shared communication link 291 to source 290-1 in subscriber domain 250-1.

As mentioned, the content source selector resource 140 can be configured to track movement of the respective playback device 240. In response to receiving location information indicating that the respective playback device 240 moves within the wireless access range 780, during a second window, the content source selector resource 140 initiates switching over to retrieval of the selected content over communication link 710-2 from source 290-1 to the respective playback device 240. In one embodiment, as mentioned, source 290-1 and source 280-1 store substantially the same content. The playback device 240 utilizes synchronization information to determine a next logical segment of content to retrieve when switching over to retrieving content from source 290-1. For example, when outside of access range 780, the playback device 240 can initiate retrieval of logical segments 1, 2, 3, . . . , and 110. At switchover, around a time when the playback device 240 moves within access range 780, the playback device 240 retrieves next logical segments of content 111, 112, etc., locally from the source 290-1 over communication link 710-2.

In accordance with further embodiments, a portable device such as a tablet, iPad™, etc., can be used as a means of consuming/controlling/and/or taking your video content with you. For example, a subscriber can use the playback device such as an iPad like a more traditional digital navigator to discover and start watching content on a large screen television in the home. Assume that the user needs to go to a remote location such as work. In such an instance, the user can perform an appropriate command such as a swipe to pull content played back on the television device to the portable playback device and take the content with him to watch, for example, on the bus. When the user arrives at work, the user can transfer playback of the content to a computer screen in the work environment. Thus, the portable device such as an iPad device can be a "bag" that allows a respective subscriber to manage the content.

Figure 8:
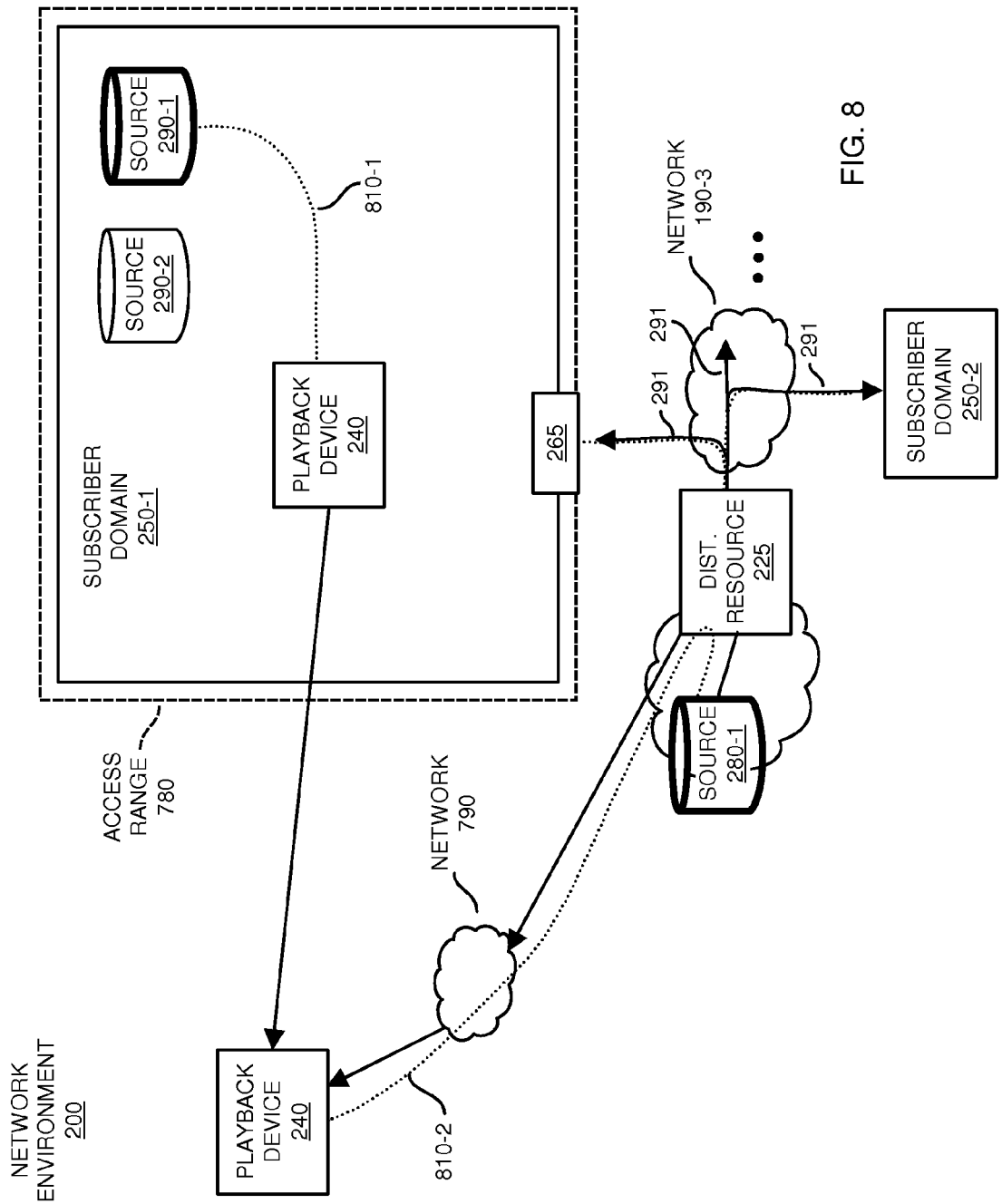
FIG. 8 is an example diagram illustrating movement of a client and switchover of distributing selected content from the second storage resource to the client to distributing selected content from the first storage resource to the client according to embodiments herein.

FIG. 8 is an example diagram illustrating switchover of distributing selected content from a second storage resource to a client to distributing selected content from a first storage resource to the client according to embodiments herein.

More specifically, the subscriber 108-1 can operate a respective playback device 240 inside of a subscriber domain 250-1. As mentioned, the priority order from which to retrieve selected content can vary depending on a current geographical location of the playback device 240.

For example, a subscriber 108-1 may initially operate a respective playback device 240 inside the subscriber domain 250-1. While inside of subscriber domain 250-1 and/or wireless access range 780, the subscriber 108-1 may also have access to content stored outside of subscriber domain 250-1 via communications over shared communication link 291 to a respective source.

In one embodiment, when the playback device 240 is located inside the access range 780, the content source selector resource 140 selects which of multiple candidate sources is best for retrieving content depending on whether the subscriber 108-1 resides inside or outside the subscriber domain 250-1.

As a more specific example, assume in this example that content selected for viewing by subscriber 108-1 on playback device 240 is stored in both source 280-1 and source 290-1. As previously discussed, the content can be partitioned into a logical sequence of segments stored in each of the source 280-1 and source 290-1.

In accordance with a first set of retrieval rules and priority order information, during a window in which the respective playback device 240 is located inside of a wireless access range 780 with respect to the subscriber domain 250-1 (such as a subscriber's home cable network environment), the content source selector resource 140 ranks the source 280-1 and source 290-1 (from which selected content is available). Because the playback device 240 is detected as being inside the subscriber domain 250-1, the content source selector resource 140 ranks source 290-1 higher in a priority order rank than source 280-1 because retrieval of content from source 280-1 would require use of bandwidth in shared communication link 291. Thus, in this example embodiment, because the playback device 240 is detected as being inside of the access range 780, the content source selector resource 140 selects source 280-1 as a source for initiating retrieval of selected content by the subscriber 108-1 to preserve bandwidth on shared communication link 291. Thus, while inside a wireless access range 780 or subscriber domain 250-1, the playback device 240 retrieves selected content over communication link 810-1 although the content could alternatively be retrieved over a path including shared communication link 291 to source 280-1.

As mentioned, the content source selector resource 140 can be configured to track movement of the respective playback device 240. In response to receiving location information indicating that the respective playback device 240 moves outside the wireless access range 780, during a second window, the content source selector resource 140 initiates switching over to retrieval of the selected content over communication link 810-2 (e.g., a WiFi network, 3G cellular network, 4G cellular network, etc.) from source 280-1 to the respective playback device 240.

As mentioned, source 290-1 and source 280-1 store substantially the same content currently selected for viewing by the subscriber 108-1 operating playback device 240. In one embodiment, the playback device 240 utilizes synchronization information to determine a next logical segment of content to retrieve when switching over to retrieving content from source 290-1. For example, when inside of access range 780, the playback device 240 can initiate retrieval of logical segments 1, 2, 3, . . . , and 76. At switchover, around a time when the playback device 240 moves outside access range 780, the playback device 240 retrieves next logical segments of content 77, 78, etc., from the source 280-1 over communication link 810-2.

Thus, a subscriber can make a selection of a single displayed title of content for viewing on the playback device 240. One embodiment of the content source selector resource 140 can be configured to provide substantially continuous playback of selected the content by performing behind-the-scene processing to select amongst the multiple sources as the playback device 240 and/or subscriber 108-1 move about a network environment. Playback is made simple because the content source selector resource 140 makes decisions on behalf of the user as to which source to retrieve the content.

Figure 9:
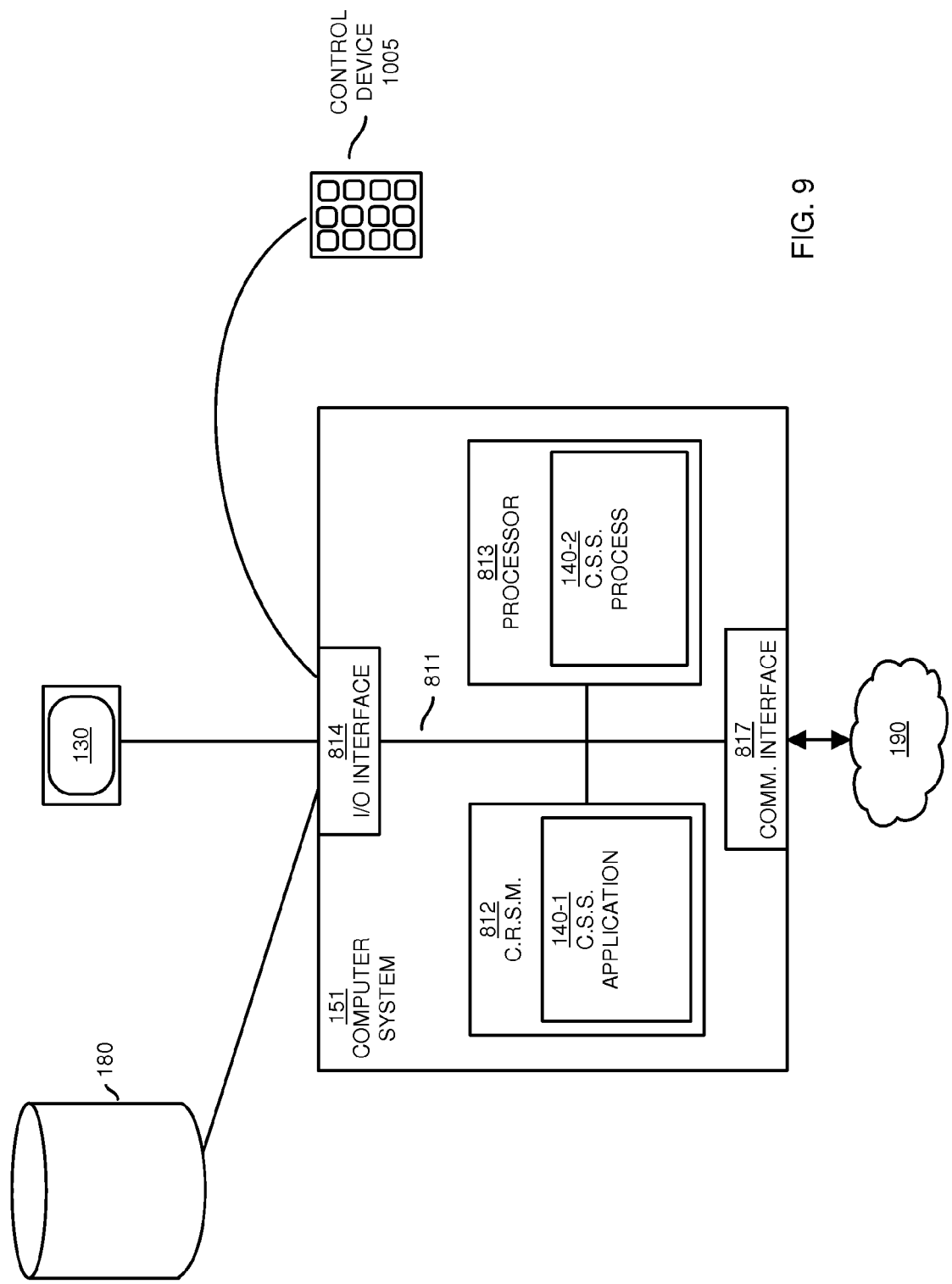
FIG. 9 is a diagram illustrating an example hardware architecture supporting execution of instructions and methods according to embodiments.

FIG. 9 is an example block diagram of a computer system for implementing any of the operations as discussed herein according to embodiments herein.

Computer system 151 can reside any where in network environment 100 and support any of the operations as discussed herein. In one embodiment, the computer system 151 executes content source selector application 140-1 to facilitate automatic selection of content from multiple sources.

As shown, computer system 151 of the present example can include an interconnect 811 that couples computer readable storage media 812 such as a non-transitory type of media (i.e., any type of hardware storage medium) in which digital information can be stored and retrieved, a processor 813, I/O interface 814, and a communications interface 817.

I/O interface 814 provides connectivity to a repository 180 (that potentially stores content availability information 150-1 and set of retrieval rules 120) and, if present, other devices such as a display screen, keypad control device 1005, a computer mouse, etc.

Computer readable storage medium 812 can be any hardware storage device such as memory, optical storage, hard drive, floppy disk, etc. In one embodiment, the computer readable storage medium 812 stores instructions and/or data.

Communications interface 817 enables the computer system 150 and processor 813 to communicate over a resource such as network 190 to retrieve information from remote sources and communicate with other computers. I/O interface 814 enables processor 813 to retrieve information stored in repository 180.

As shown, computer readable storage media 812 is encoded with content source selector application 140-1 (e.g., software, firmware, etc.) executed by processor 813. Content source selector application 140-1 (e.g., encoder application) can be configured to include instructions to implement any of the operations as discussed herein.

During operation of one embodiment, processor 813 (e.g., one or more processor devices) accesses computer readable storage media 812 via the use of interconnect 811 in order to launch, run, execute, interpret or otherwise perform the instructions in content source selector application 140-1 stored on computer readable storage medium 812.

Execution of the content source selector application 140-1 produces processing functionality such as content source selector process 140-2 in processor 813. In other words, the content source selector process 140-2 associated with processor 813 represents one or more aspects of executing content source selector application 140-1 (e.g., functions supported by content source selector resource 140, within or upon the processor 813 in the computer system 150.

Those skilled in the art will understand that the computer system 150 can include other processes and/or software and hardware components, such as an operating system that controls allocation and use of hardware resources to execute content source selector application 140-1.

In accordance with different embodiments, note that computer system may be any of various types of devices, including, but not limited to, a server resource, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 150 may reside at any location or can be included in any suitable resource in network environment 100 to implement functionality as discussed herein.

Functionality supported by the different resources will now be discussed via flowcharts in FIGS. 10, 11, and 12. Note that the steps in the flowcharts below can be executed in any suitable order.

Figure 10:
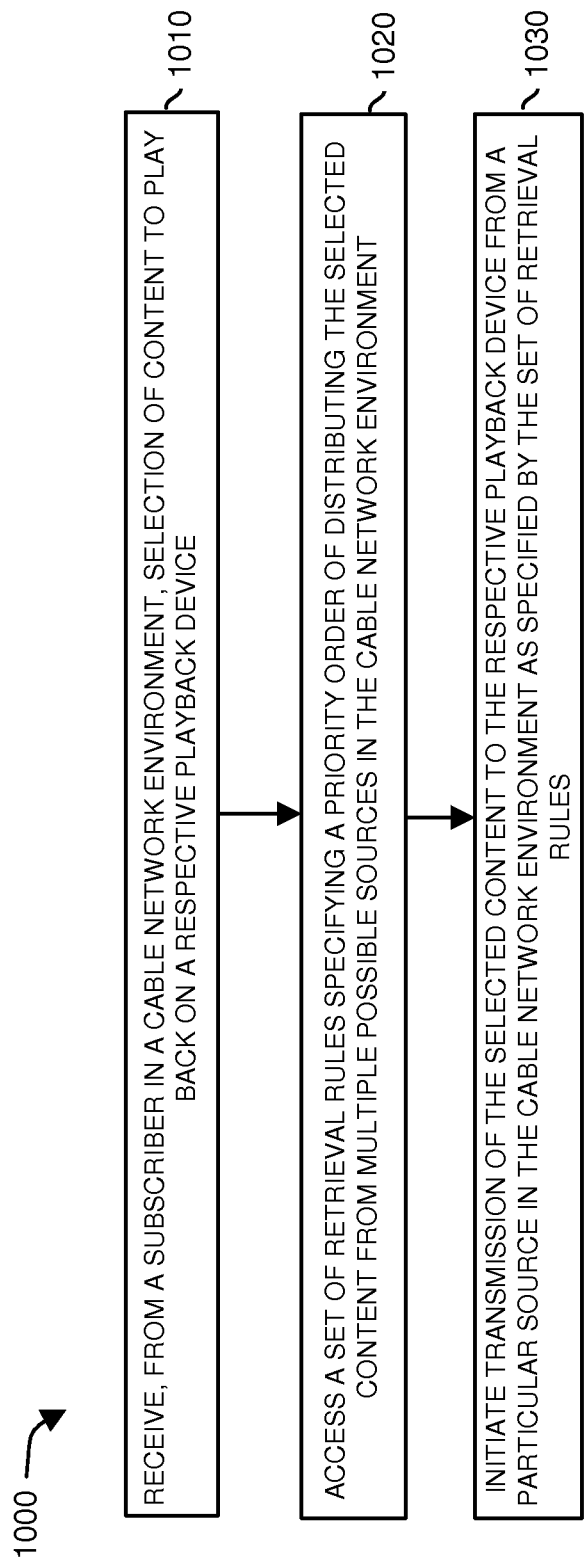
FIGS. 10, 11, and 12 are flowcharts illustrating example methods according to embodiments herein.

FIG. 10 is a flowchart 1000 illustrating an example method according to embodiments. Note that there will be some overlap with respect to concepts as discussed above.

In processing block 1010, the content source selector resource 140 receives, from a subscriber 108-1 in a cable network environment, selection of content to play back on a respective playback device 240.

In processing block 1020, the content source selector resource 140 accesses a set of retrieval rules 120 specifying a priority order 125 of distributing the selected content from multiple possible sources in the cable network environment.

In processing block 1030, the content source selector resource 140 initiates transmission of the selected content to the respective playback device 240 from a particular source in the cable network environment as specified by the set of retrieval rules 120. In one embodiment, as previously discussed, the content source selector resource 140 notifies the playback device 240 from which source to retrieve selected content.

Figure 11:
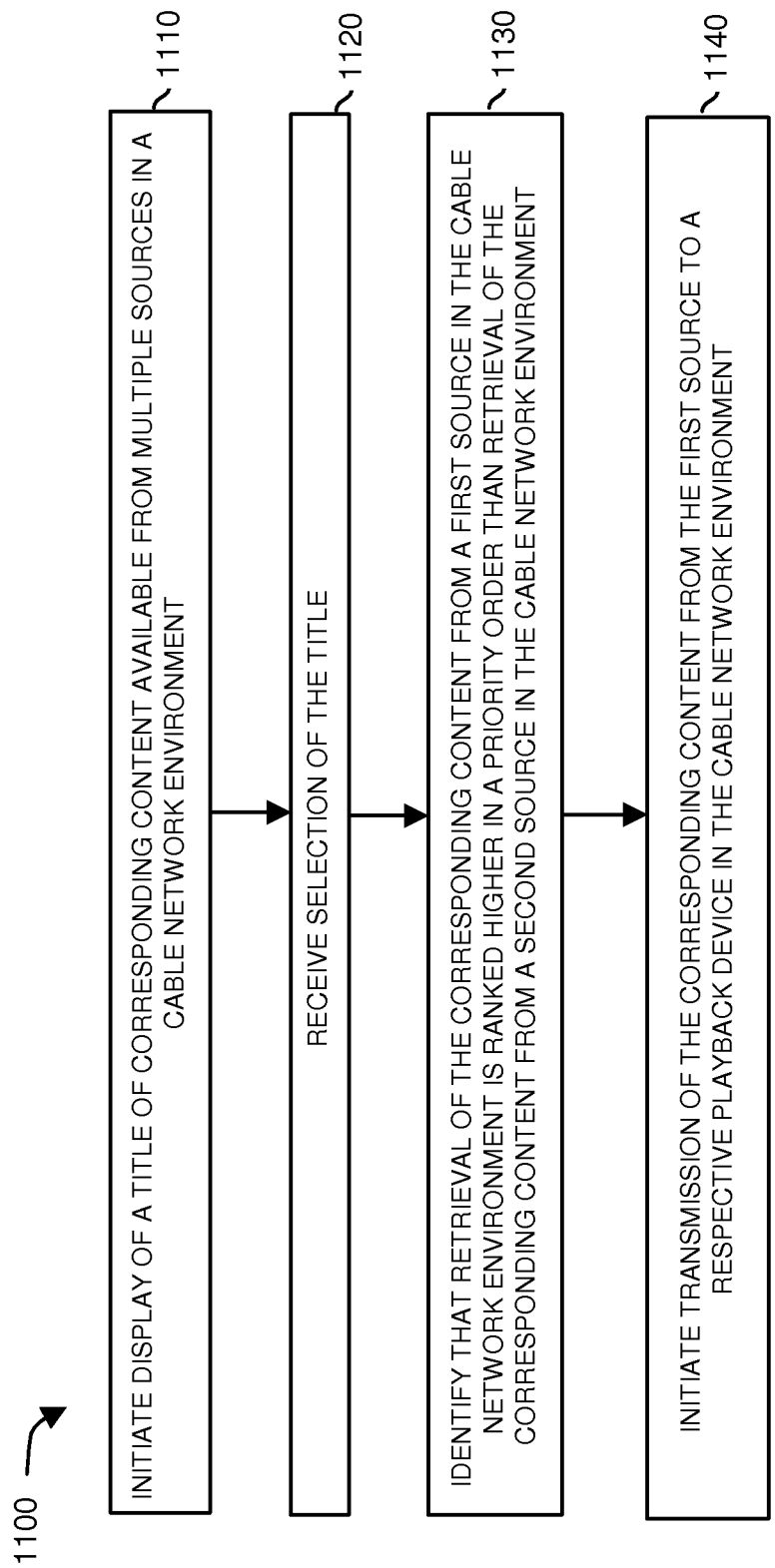

FIG. 11 is a flowchart 1100 illustrating an example method according to embodiments herein. Note that there will be some overlap with respect to concepts as discussed above.

In processing block 1110, a playback device 240 initiates display of a title of corresponding content available from multiple sources in a cable network environment.

In processing block 1120, the content source selector resource 140 receives selection of the title.

In processing block 1130, the content source selector resource 140 identifies that retrieval of the corresponding content from a first source in the cable network environment is ranked higher in a priority order 125 than retrieval of the corresponding content from a second source in the cable network environment.

In processing block 1140, the content source selector resource 140 initiates transmission of the corresponding content from the first source to a respective playback device in the cable network environment.

Figure 12:
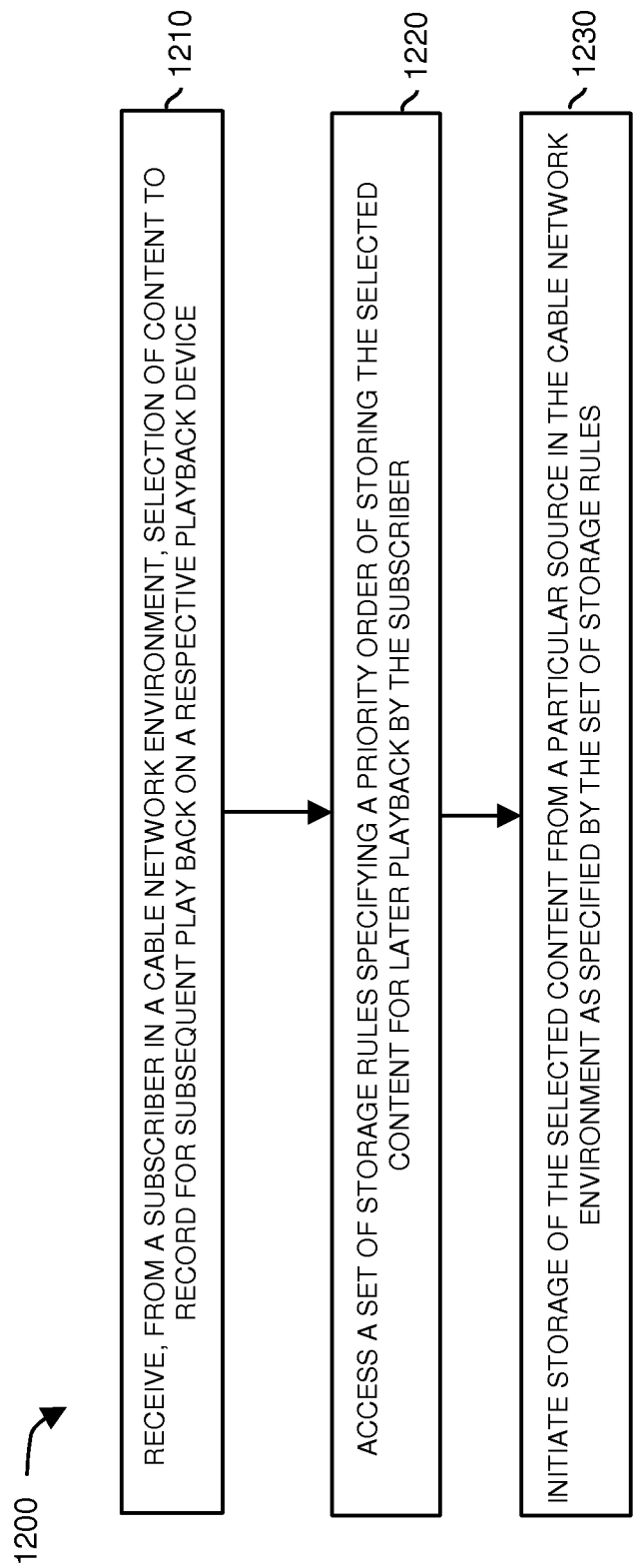

FIG. 12 is a flowchart 1200 illustrating an example method according to embodiments herein. Note that there will be some overlap with respect to concepts as discussed above.

In processing block 1210, the content source selector resource 140 receives, from a subscriber 108-1 in a cable network environment, selection of content to record for subsequent play back on a respective playback device 240.

In processing block 1220, the content source selector resource 140 accesses a set of storage rules specifying a priority order of storing the selected content for later playback by the subscriber 108-1.

In processing block 1230, the content source selector resource 140 initiates storage of the selected content from a particular source in the cable network environment as specified by the set of storage rules.

Note again that techniques herein are well suited for making it easier for a respective subscriber in a cable network environment to efficiently retrieve and/or store selected content. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
  receiving, from a subscriber in a cable network environment, selection of content to play back on a respective playback device;
  receiving content availability information, the content availability information indicating multiple possible sources from which the selected content is available to the subscriber, the content availability information indicating a classification type assigned to each of the multiple possible sources, wherein the content availability information is generated prior to receiving the selection of content from the subscriber;
  accessing a set of retrieval rules specifying a priority order of distributing the selected content from the multiple possible sources in the cable network environment, the priority order specifying an ordering of distributing the selected content based on the classification types; and
  initiating transmission of the selected content to the respective playback device from a particular source amongst the multiple possible sources in the cable network environment as specified by the priority order of classification types in the set of retrieval rules;
  wherein the set of retrieval rules is a first set of retrieval rules;
  wherein the particular source is a first repository storing a first copy of the selected content, the method further comprising:
  in response to detecting presence of the respective playback device in a first geographical location, utilizing the first set of retrieval rules associated with the first geographical location to transmit the selected content to the respective playback device;
  in accordance with the first set of retrieval rules, during a first window in which the respective playback device is detected as being present in the first geographical location, initiating transmission of the selected content over a first communication link from the first repository to the respective playback device;
  tracking movement of the respective playback device to a second geographical location;
  in response to detecting presence of the respective playback device in the second geographical location, utilizing a second set of retrieval rules associated with the second geographical location to transmit the selected content to the respective playback device;
  in accordance with the second set of retrieval rules, during a second window in which the respective playback device is detected as being present in the second geographical location, initiating transmission of the selected content over a second communication link from a second repository to the respective playback device;
  wherein the first set of retrieval rules indicates that a type classification of the first repository is higher in priority than a type classification of the second repository during conditions in which the respective playback device is present in the first geographical location; and
  wherein the second set of retrieval rules indicates that the type classification of the second repository is higher in priority than the type classification of the first repository during conditions in which the respective playback device is present in the second geographical location.

2. The method as in claim 1 further comprising:
  producing the content availability information to indicate which of multiple different titles of content are available to the subscriber from each of the multiple possible sources; and
  subsequent to receiving the selection of content, utilizing the content availability information to identify that the selected content is retrievable from multiple different disparately located sources including the particular source.

3. The method as in claim 1 further comprising:
  producing the priority order to select transmission of the selected content from a storage resource within a subscriber domain in which the subscriber resides in lieu of transmission of the selected content over a communication link shared by a service group in the cable network environment.

4. The method as in claim 1 further comprising:
  identifying that the selected content is available to the subscriber from a first source over a communication link that is shared by a service group of multiple subscribers in the cable network environment;
  identifying that the selected content is not available to the subscriber from a second source disposed in a subscriber domain in which the subscriber resides;
  processing the set of retrieval rules; and
  based on the processing, identifying that retrieval of the selected content from the first source is ranked highest for retrieval of the selected content.

5. The method as in claim 4, wherein initiating transmission of the selected content to the respective playback device includes:
  initiating transmission of the selected content from the first source as specified by the set of retrieval rules to the respective playback device.

6. The method as in claim 1 further comprising:
  in a content guide, presenting the subscriber with a single selectable display option to play back a particular title of content even though the particular title of content is available from the multiple possible sources; and
  wherein receiving the selection of content includes receiving selection of the single selectable display option from the content guide.

7. The method as in claim 6 further comprising:
  subsequent to receiving selection of the single selectable display option, identifying a grouping of multiple disparately located resources in the cable network environment from which the selected content is available; and
  as specified by the set of retrieval rules, selecting the particular source amongst the multiple disparately located resources in the grouping to initiate the play back of the selected content on the respective playback device.

8. The method as in claim 1 further comprising:
monitoring bandwidth available on at least one QAM (Quadrature Amplitude Modulated) channel in the cable network environment;
monitoring bandwidth available on IP (Internet Protocol) data channel in the cable network environment; and
selecting the particular source from which to transmit the selected content to the respective playback device based at least in part on the bandwidth available on the at least one QAM channel and the at least one IP data channel.

9. A computer system comprising:
at least one processor device; and
a hardware storage resource coupled to the at least one processor device, the hardware storage resource storing instructions that, when executed by the at least one processor device, cause the at least one processor device to perform the operations of:
receiving, from a subscriber in a cable network environment, selection of content to play back on a respective playback device;
receiving content availability information, the content availability information indicating multiple possible sources from which the selected content is available to the subscriber, the content availability information indicating a classification type assigned to each of the multiple possible sources, wherein the content availability information is generated prior to receiving the selection of content from the subscriber;
accessing a set of retrieval rules specifying a priority order of distributing the selected content from the multiple possible sources in the cable network environment, the priority order specifying an ordering of distributing the selected content based on the classification types; and
initiating transmission of the selected content to the respective playback device from a particular source amongst the multiple possible sources in the cable network environment as specified by the priority order of classification types in the set of retrieval rules;
wherein the set of retrieval rules is a first set of retrieval rules;
wherein the particular source is a first repository storing a first copy of the selected content, the method further comprising:
in response to detecting presence of the respective playback device in a first geographical location, utilizing the first set of retrieval rules associated with the first geographical location to transmit the selected content to the respective playback device;
in accordance with the first set of retrieval rules, during a first window in which the respective playback device is detected as being present in the first geographical location, initiating transmission of the selected content over a first communication link from the first repository to the respective playback device;
tracking movement of the respective playback device to a second geographical location;
in response to detecting presence of the respective playback device in the second geographical location, utilizing a second set of retrieval rules associated with the second geographical location to transmit the selected content to the respective playback device;
in accordance with the second set of retrieval rules, during a second window in which the respective playback device is detected as being present in the second geographical location, initiating transmission of the selected content over a second communication link from a second repository to the respective playback device;
wherein the first set of retrieval rules indicates that a type classification of the first repository is higher in priority than a type classification of the second repository during conditions in which the respective playback device is present in the first geographical location; and
wherein the second set of retrieval rules indicates that the type classification of the second repository is higher in priority than the type classification of the first repository during conditions in which the respective playback device is present in the second geographical location.

10. The computer system as in claim 9, wherein the at least one processor device further supports operations of:
producing content availability information to indicate which of multiple different titles of content are available to the subscriber from each of the multiple possible sources; and
subsequent to receiving the selection of content, utilizing the content availability information to identify that the selected content is retrievable from multiple different disparately located sources including the particular source.

11. The computer system as in claim 9, wherein the at least one processor device further supports operations of:
presenting the subscriber with a single selectable option to play back a particular title of content even though the particular title of content is available from multiple different sources; and
wherein receiving the selection of content includes receiving selection of the single selectable option.

12. The computer system as in claim 11, wherein the at least one processor device further supports operations of:
subsequent to receiving selection of the single selectable option, identifying a grouping of multiple disparately located resources in the cable network environment from which the selected content is available; and
as specified by the set of retrieval rules, selecting the particular source amongst the multiple disparately located resources in the grouping to initiate the play back of the selected content on the respective playback device.

13. Computer-readable storage hardware having instructions stored thereon, the instructions, when carried out by a processing device, causes the processing device to perform operations of:
receiving, from a subscriber in a cable network environment, selection of content to play back on a respective playback device;
receiving content availability information, the content availability information indicating multiple possible sources from which the selected content is available to the subscriber, the content availability information indicating a classification type assigned to each of the multiple possible sources, wherein the content availability information is generated prior to receiving the selection of content from the subscriber;
accessing a set of retrieval rules specifying a priority order of distributing the selected content from the multiple possible sources in the cable network environment, the priority order specifying an ordering of distributing the selected content based on the classification types; and
initiating transmission of the selected content to the respective playback device from a particular source amongst the multiple possible sources in the cable network environment as specified by the priority order of classification types in the set of retrieval rules;

wherein the set of retrieval rules is a first set of retrieval rules;

wherein the particular source is a first repository storing a first copy of the selected content, the method further comprising:

in response to detecting presence of the respective playback device in a first geographical location, utilizing the first set of retrieval rules associated with the first geographical location to transmit the selected content to the respective playback device;

in accordance with the first set of retrieval rules, during a first window in which the respective playback device is detected as being present in the first geographical location, initiating transmission of the selected content over a first communication link from the first repository to the respective playback device;

tracking movement of the respective playback device to a second geographical location;

in response to detecting presence of the respective playback device in the second geographical location, utilizing a second set of retrieval rules associated with the second geographical location to transmit the selected content to the respective playback device;

in accordance with the second set of retrieval rules, during a second window in which the respective playback device is detected as being present in the second geographical location, initiating transmission of the selected content over a second communication link from a second repository to the respective playback device;

wherein the first set of retrieval rules indicates that a type classification of the first repository is higher in priority than a type classification of the second repository during conditions in which the respective playback device is present in the first geographical location; and wherein the second set of retrieval rules indicates that the type classification of the second repository is higher in priority than the type classification of the first repository during conditions in which the respective playback device is present in the second geographical location.

14. The method as in claim 6 further comprising:
initiating transmission of the selected content to the respective playback device without the subscriber having to provide further input of selecting the particular source to play back the selected content.

15. The method as in claim 14 further comprising:
via a content source selector resource application, and the set of retrieval rules, making decisions on behalf of the subscriber as to which of the multiple possible sources to retrieve the selected content.

16. The method as in claim 15, wherein the content availability information indicates that the selected content is available from a first source and a second source;

wherein the set of retrieval rules indicates a ranked order in which a classification of the first source is ranked higher in priority than a classification of the second source for transmitting the selected content to the respective playback device;

in addition to receiving the set of retrieval rules, receiving metadata indicating fee information, the fee information indicating fees associated with retrieval of the selected content from the first source and retrieval of the selected content from the second source; and in response to detecting that a first fee for retrieving the selected content from the first source is greater than a second fee for retrieving the selected content from the second source, overriding the ranked order and initiating transmission of the selected content to the respective playback device from the second source instead of the first source.

17. The method as in claim 1 further comprising:
via a content source selector resource application, and the set of retrieval rules, making decisions on behalf of the subscriber as to which of the multiple possible sources to retrieve the selected content.

18. The method as in claim 1, wherein initiating transmission of the selected content over the first communication link from the first repository to the respective playback device includes transmission of a first ordered sequence of logical segments of the selected content over the first communication link to the respective playback device; and wherein initiating transmission of the selected content over the second communication link from the second repository to the respective playback device includes transmission of a second ordered sequence of logical segments of the selected content over the second communication link to the respective playback device, the second ordered sequence of logical segments consecutive with respect to the first ordered sequence of logical segments.

19. The method as in claim 1, wherein the content availability information indicates that the selected content is available from a first source and a second source;

wherein the set of retrieval rules indicates a ranked order in which a classification type of the first source is ranked higher in priority than a classification type of the second source for transmitting the selected content to the respective playback device;

in addition to receiving the set of retrieval rules, receiving metadata indicating fee information, the fee information indicating fees associated with retrieval of the selected content from the first source and retrieval of the selected content from the second source; and in response to detecting that a first fee for retrieving the selected content from the first source is greater than a second fee for retrieving the selected content from the second source, overriding the ranked order and initiating transmission of the selected content to the respective playback device from the second source instead of the first source.

20. The method as in claim 14, wherein the content availability information indicates that the selected content is available from a first source and a second source;

wherein the set of retrieval rules indicates a ranked order in which a classification of the first source is ranked higher in priority than a classification of the second source for transmitting the selected content to the respective playback device;

in addition to receiving the set of retrieval rules, receiving metadata indicating fee information, the fee information indicating fees associated with retrieval of the selected content from the first source and the second source; and in response to detecting that a first fee for retrieving the selected content from the first source is greater than a second fee for retrieving the selected content from the second source, overriding the ranked order and initiating transmission of the selected content to the respective playback device from the second source instead of the first source.

21. The method as in claim 1, wherein the content availability information maps the selected content to identities of the multiple possible sources, an identity of each of the multiple sources in the content availability information source assigned a respective classification type.

22. The method as in claim 6, wherein the content availability information is received prior to receiving the selection of content from the subscriber.

\* \* \* \* \*